US008918782B2

(12) United States Patent
Robinson et al.

(10) Patent No.: US 8,918,782 B2
(45) Date of Patent: Dec. 23, 2014

(54) SOFTWARE IMAGE DISTRIBUTION (75) Inventors: Ian W. Robinson, Holly Springs, NC (US); Andrew T. Mason, Amity, OR (US); Brendan T. Power, Seattle, WA (US); David B. Cross, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 13/117,141

(22) Filed: May 27, 2011

(65) Prior Publication Data

US 2012/0304167 A1 Nov. 29, 2012

(51) Int. Cl.
*G06F 9/445* (2006.01)

(52) U.S. Cl.
CPC ............................ *G06F 8/63* (2013.01)
USPC ............................. 717/177; 717/168; 717/172

(58) Field of Classification Search
CPC ............................................................ G06F 8/61
USPC ................... 717/168–178; 709/204, 223, 242
See application file for complete search history.

(56) References Cited

U.S. PATENT DOCUMENTS

| | | | |
|---|---|---|---|
| 6,038,399 A * | 3/2000 | Fisher et al. | 717/178 |
| 6,397,385 B1 * | 5/2002 | Kravitz | 717/173 |
| 6,571,283 B1 | 5/2003 | Smorodinsky | |
| 6,964,042 B2 | 11/2005 | Lagergren | |
| 7,356,679 B1 * | 4/2008 | Le et al. | 713/1 |
| 7,379,982 B2 | 5/2008 | Tabbara | |
| 7,512,940 B2 * | 3/2009 | Horvitz | 717/173 |
| 7,574,491 B2 | 8/2009 | Stein et al. | |
| 7,761,867 B2 * | 7/2010 | Goetz et al. | 717/174 |
| 7,802,084 B2 * | 9/2010 | Fitzgerald et al. | 713/2 |
| 2002/0087963 A1 * | 7/2002 | Eylon et al. | 717/174 |
| 2005/0081197 A1 * | 4/2005 | DeBoer et al. | 717/174 |
| 2005/0132349 A1 * | 6/2005 | Roberts et al. | 717/168 |
| 2008/0098386 A1 * | 4/2008 | Leung et al. | 717/174 |
| 2009/0083733 A1 * | 3/2009 | Chen et al. | 717/178 |

FOREIGN PATENT DOCUMENTS

EP 1868351 * 12/2007 ............ H04L 29/08

OTHER PUBLICATIONS

Dolado, Jose Javier. "A validation of the component-based method for software size estimation." Software Engineering, IEEE Transactions on 26.10 (2000), pp. 1006-1021.*

Augerat, Philippe, et al. "A scalable file distribution and operating system installation toolkit for clusters." Proceedings of the 2nd IEEE/ACM International Symposium on Cluster Computing and the Grid, Berlin. 2002, pp. 1-7.*

(Continued)

*Primary Examiner* — Satish Rampuria
(74) *Attorney, Agent, or Firm* — Henry Gabryjelski; Kate Drakos; Micky Minhas (57) ABSTRACT

Aspects of the subject matter described herein relate to image distribution. In aspects, portions of an installation image of an operating system may be distributed to one or more repositories. In conjunction with determining a distribution of the installation image, one or more factors may be received. Based on the factor(s), a distribution manager may determine one or more repositories over which the data of the installation image is to be distributed. An indication of this distribution may be persisted for use in obtaining the data from the one or more repositories for installing, configuring, and/or re-configuring the operating system.

19 Claims, 5 Drawing Sheets

(56) References Cited

OTHER PUBLICATIONS

Vallée, Geoffroy, et al. "Ssi-oscar: a cluster distribution for high performance computing using a single system image." High Performance Computing Systems and Applications, 2005. HPCS 2005. 19th International Symposium on. IEEE, 2005, pp. 1-7.*

"IBM Data Server Client Types", Retrieved at << http://publib.boulder.ibm.com/infocenter/db2luw/v9r7/index.jsp?topic=/com.ibm.swg.im.dbclient.install.doc/doc/c0022612.html >>, Retrieved Date : Mar. 31, 2011, pp. 3.

"Advanced Run-Time Image Techniques", Retrieved at << http://msdn.microsoft.com/en-us/library/dd873577.aspx >>, May 2009, pp. 9.

"XPE Server in a Box", Retrieved at << http://www.emacinc.com/servers/xpe_sib.htm >>, Retrieved Date : Mar. 31, 2011, pp. 4.

"Windows Server 2008 R2 with Hyper-V and Xen: Too Much Code", Retrieved at << http://www.vmware.com/technical-resources/advantages/architectures.html, Retrieved Date : Mar. 31, 2011, p. 1.

* cited by examiner

SOFTWARE IMAGE DISTRIBUTION

BACKGROUND

When installing an operating system, all the files of the installation media (e.g., a CD or DVD) may be copied to the installation location. This allows a system administrator to reconfigure the operating system without finding and re-inserting the installation media. Unfortunately, depending on the size of data on the installation media, this may also lead to wasted space on the installation location—particularly if the all the features included in the installation media are never installed for the operating system.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to image distribution. In aspects, portions of an installation image of an operating system may be distributed to one or more repositories. In conjunction with determining a distribution of the installation image, one or more factors may be received. Based on the factor(s), a distribution manager may determine one or more repositories over which the data of the installation image is to be distributed. An indication of this distribution may be persisted for use in obtaining the data from the one or more repositories for installing, configuring, and/or re-configuring the operating system.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
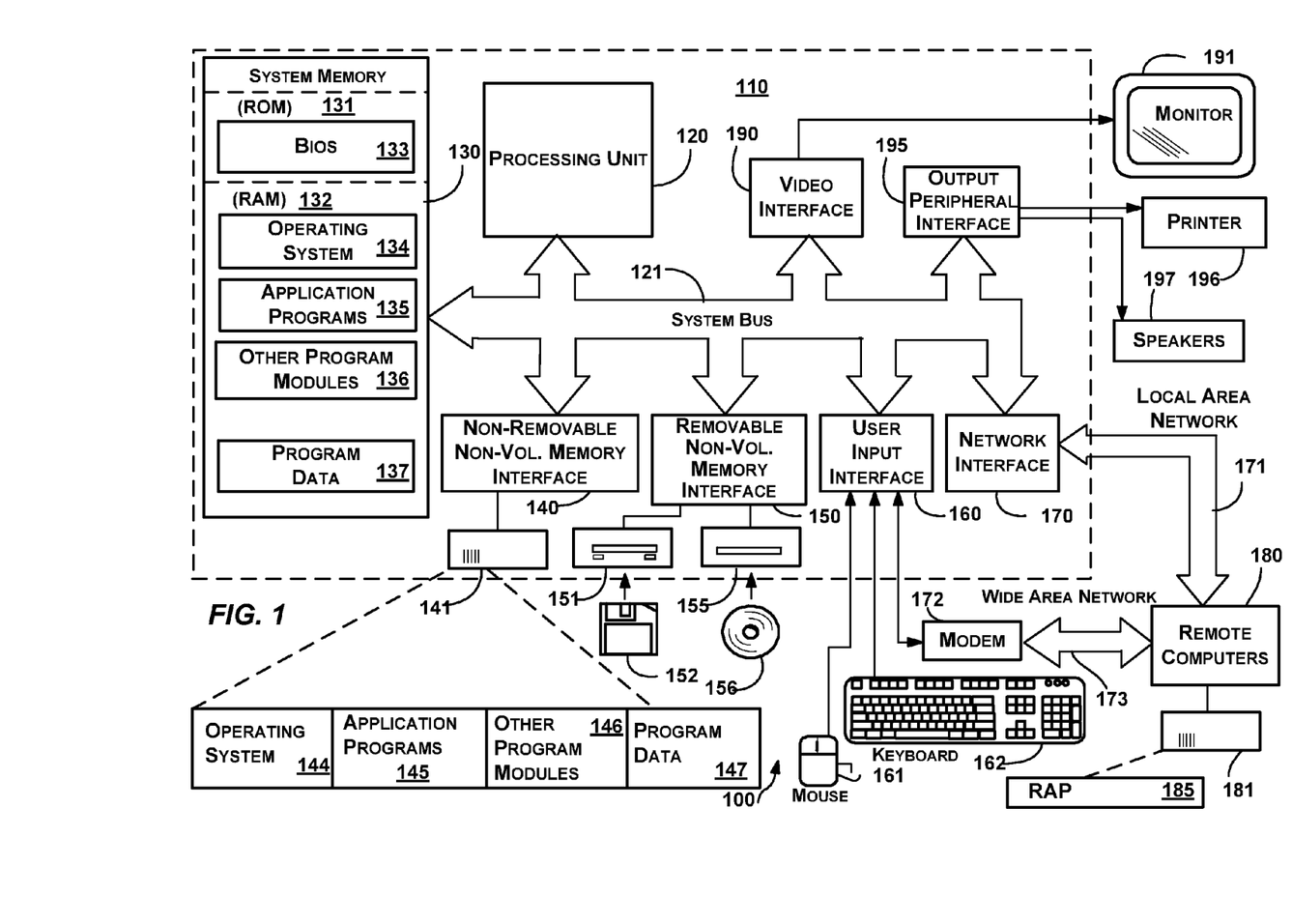
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Image Distribution

Figure 2:
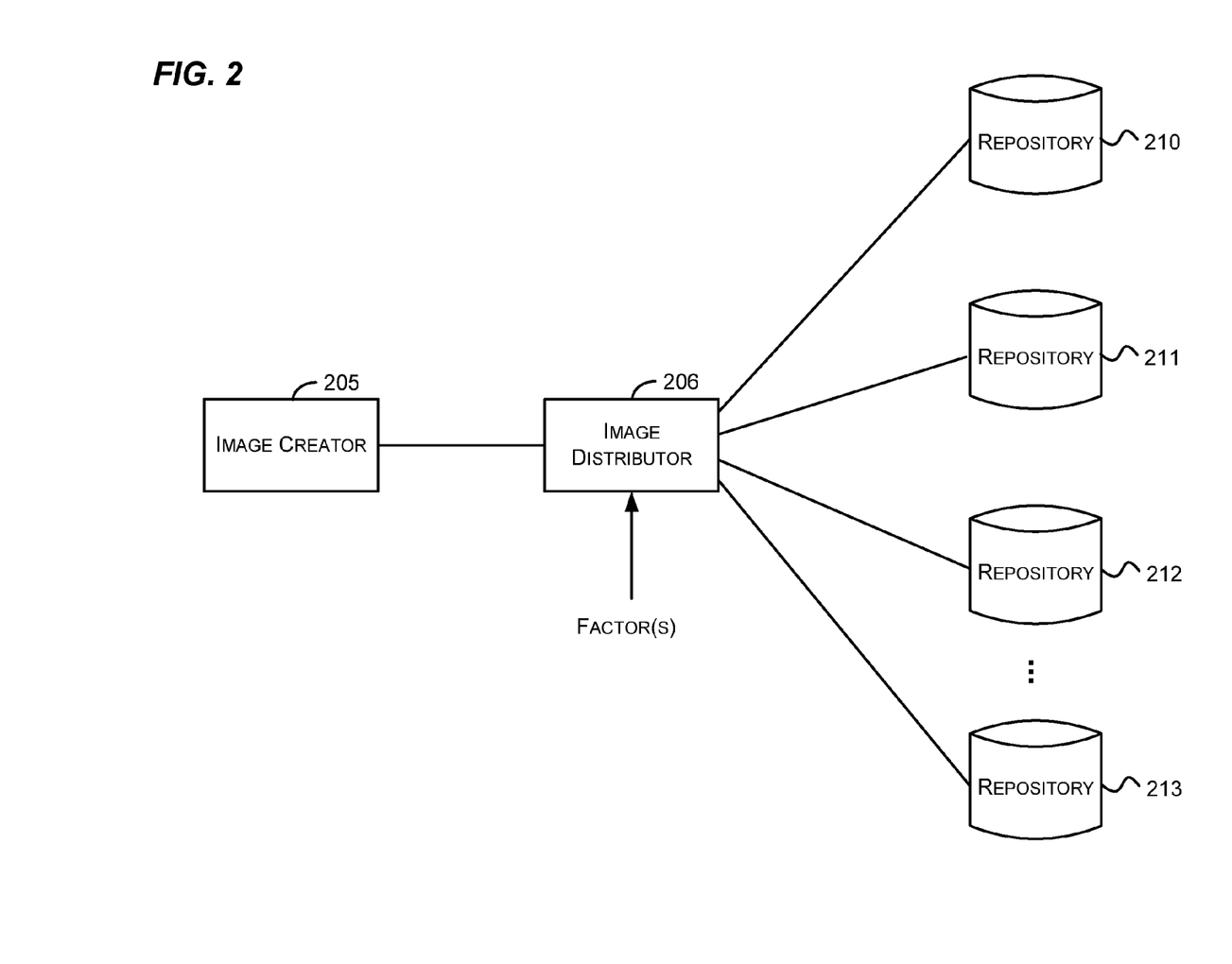
FIG. 2 is a block diagram that generally represents an environment in accordance with aspects of the subject matter described herein.

As mentioned previously, copying files to an installation location may result in wasted space. FIG. 2 is a block diagram that generally represents an environment in accordance with aspects of the subject matter described herein. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the environment includes an image creator 205, an image distributor 206, repositories 210-213 and may also include other components (not shown).

As used herein, the term component is to be read to include hardware such as all or a portion of a device, a collection of one or more software modules or portions thereof, some combination of one or more software modules or portions thereof and one or more devices or portions thereof, and the like.

A component may include or be represented by code. Code includes instructions that indicate actions a computer is to take. Code may also include information other than actions the computer is to take such as data, resources, variables, definitions, relationships, associations, and the like that.

The various components may be located relatively close to each other (e.g., on the same machine or on machines on the same network) or may be distributed across the world. The various components may communicate with each other via various networks including intra- and inter-office networks.

The image creator 205 and the image distributor 206 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

In one embodiment, the image creator 205 may include a software development tool. The software development tool may implement an integrated development environment (IDE) that allows a software developer to enter and update code, debug code, create and update databases, associate the code with one or more databases, compile the code, create an installation image, do other actions, and the like.

As used herein, an installation image comprises data that may be used, for example, to install, configure, and/or re-configure an operating system. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

Although the term "operating system" is sometimes used here, the teachings herein may also be applied to software other than the operating system. For example, the teachings herein may be applied to software development software, database software, productivity software, and other software without departing from the spirit or scope of aspects of the subject matter described herein.

An installation image may be organized into components. Metadata may indicate allowed combinations of subsets of these components. For example, the metadata may indicate that an operating system may be configured to have certain combinations of the components installed. These combinations may correspond, for example, to combinations that are designated as tested and supported (e.g., by the operating system vendor).

The repositories 210-213 may include data stores upon which components of the installation image may be stored. One or more of the repositories 210-213 may be implemented by a local repository of a device upon which an operating system corresponding to the installation image already is or is to be installed. For example, if an operating system is to be installed on a computer (e.g., such as the computer 110 of FIG. 1), the local repository of the computer (e.g., the hard disk drive 141 of FIG. 1) may be one of the repositories 210-213 upon which components of the installation image may be stored.

Repositories which are not local repositories are sometimes referred to herein as remote repositories. A remote repository refers to a data store that is not hosted by a device upon which an operating system corresponding to the installation image already is installed or is to be installed. For example, referring to FIG. 1, the memory storage device 181 may be a remote repository to the computer 110. As another example, a remote repository may be hosted by a server reachable via the Internet or some other network.

Although four repositories are illustrated in FIG. 2, there may be as few as one repository or as many more than one repository as desired without departing from the spirit or scope of aspects of the subject matter described herein.

The image distributor 206 may be responsible for distributing the components of an image over one or more of the repositories 210-213. For example, if an administrator wants to have a minimal footprint on the local storage of an operating system, the administrator may indicate that the combination of components that has the smallest size be installed on the local repository while the other components be installed on one or more of the remote repositories. In this example, the image distributor 206 may store a minimal footprint of the components on the local repository while storing other components on remote repositories.

As another example, an administrator may want to have a complete set of components on the destination device. In this case, the image distributor 206 may put all of the components on the local repository and no components on the remote repositories. This may make it easier, for example, to re-configure the operating system of the destination device.

The image distributor 206 may receive a set of one or more factors for distributing data of an installation image to one or more of the repositories 210-213. Some exemplary factors include size indicators, servicing needs, relevance to a server's role, fulfilling a dependency, other factors, and the like. For example, where relevance to a server's role is a concern, undesired functionality can be removed to increase security or to eliminate conflicting functionality or applications on the same server. For fulfilling a dependency, if feature X depends on features Y and Z, the image distributor 206 may use this factor as an indication to prefer placing the features on the same repository provided other factors (e.g., size limitations or other factors) do not override this placement.

A size indicator may specify the maximum size of the portion of the installation image that is to be stored on a repository, a minimum size of the portion of the installation image that is to be stored on a repository, or a range of allowable sizes to be stored on a repository. A size indicator may be specified numerically, symbolically, relatively, or in some other manner without departing from the spirit or scope of aspects of the subject matter described herein. For example, a size indicator may indicate that X bytes are to be stored on a local repository. As another example, a size indicator may indicate a percentage of the image is to be stored on a local repository. As another example, a size indicator may indicate a range of bytes that may be stored on a repository. With this information, the image distributor 206 may perform actions, including:

1. Obtaining metadata that indicates a set of allowed combinations of subsets of components of the installation image;

2. Calculating an amount of storage needed for the components based on the metadata. This may be done by determining the space needed for each of the components indicated by the metadata and adding that space together to form a sum of the total space needed for a combination of components; and 3. Indicating a subset of the components to place on a repository.

In determining a subset of the components to place on the local repository, the image distributor may identify one or more sets of components where the components in each set are pre-designated for location together on one repository and group such sets together until the grouped one or more sets of components have a size less than the size of data that is to be located on the repository. Identifying the one or more sets of components may include searching a data structure that indicates a hierarchy of the one or more sets of components where the hierarchy indicates a priority for having each of the one or more sets of components on the local repository.

The size indictors may indicate a size of components for two or more of the repositories. For example, the size indicators may indicate that X bytes of data are to be stored on the repository 210, Y bytes of data are to be stored on the repository 211, and the remainder of the data, if any, is to be stored on the repositories 212-213.

As another example, the size indicators may indicate a size of components for each of the repositories upon which the components are to be stored. For example, the size indicators may indicate that X bytes of the data are to be stored on the repository 210 and that the remainder of the bytes are to be stored on the repository 211.

The size indicators may include indicators of the specific combination of components that are to be stored on one or more repositories. For example, the size indicators may indicate that core operating system files are to be installed on the local repository 210, that another combination of components is to be stored on the repository 211, and so forth. The size of each combination may be calculated to determine the size of data for each of the repositories.

As another example, the size indicators may include an indication of installable components of the operating system and an indication of a repository to which each of the installable components is to be distributed. For example, the size indicators may indicate that a first set of components are to be stored on the repository 210, that a second set of components are to be stored on the repository 211, and so forth.

Servicing factors may include, for example, predicted or historical frequency of servicing of the components. For example, where servicing needs for installed components are expected to be relatively more frequent, it may be more desirable to have certain components placed on a local repository to facilitate the servicing needs. Servicing factors may also include, for example, servicing that involves reboots of a machine. For servicing factors that involve reboots, it may be desirable to have certain components placed on a local repository for use during rebooting.

Components may be distributed to volumes associated with virtual machines. For example, a virtual storage device such as a virtual hard drive may be used to boot a virtual machine that hosts the operating system. Some of the data of an image may be distributed to the virtual storage device while other of the data may be distributed outside of the virtual storage device. At the physical level, a virtual storage device may include a file that is stored on a volume of a hard drive. A location outside of the virtual storage device may include any storage location outside of the file including another portion of the same hard drive.

The image distributor 206 may also store an indication of the distribution of data in a persistent data store so that the data may be located later when the operating system is to be installed, configured, or reconfigured. This indication of the distribution may be stored as metadata that the operating system, installation program, or other program may access to determine where the data is located. The indication may indicate components that are stored locally and components that are stored remotely and may provide identifiers of data stores that store components.

The operating system mentioned herein may include a server operating system, a desktop operating system, a mobile operating system, an embedded operating system, a cloud-based operating system, an operating system installed or to be installed in a virtual environment, a distributed operating system, a combination of two or more of the above, or the like.

In addition to storing an indication of the distribution of the data in a persistent data store, the image distributor 206 may also encode policy information in the persistent data store. The policy information may indicate what components of the operating system are allowed to be installed. The policy information may also indicate what components certain users are allowed to install.

Figure 3:
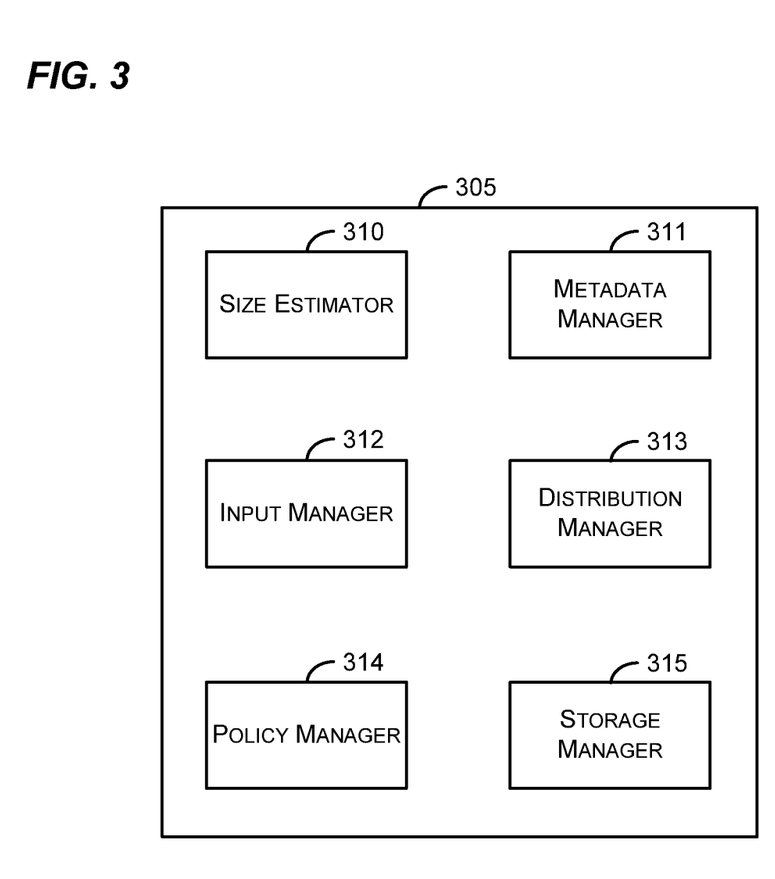
FIG. 3 is a block diagram that illustrates some exemplary components of an image distributor in accordance with aspects of the subject matter described herein.

FIG. 3 is a block diagram that illustrates some exemplary components of an image distributor in accordance with aspects of the subject matter described herein. The components illustrated in FIG. 3 are exemplary and are not meant to be all-inclusive of components that may be needed or included. In other embodiments, the components described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the image distributor 305 may, for example, include a size estimator 310, a metadata manager 311, an input manager 312, a distribution manager 313, a policy manager 314, a storage manager 315, and other components (not shown). The image distributor 305 corresponds to the image distributor 206 of FIG. 2 and may be implemented in a similar manner as the image distributor 206.

The input manager 312 may be operable to receive a set of one or more size indicators for distributing data of an installation image to one or more repositories. For example, the input manager 312 may receive the size indicators previously mentioned. The input manager 312 may include a user interface, programming interface, or other interface, installation manager, configuration manager, other input mechanism, or the like. Through the input manager 312, a repository may be associated with a corresponding size indicator. For example, through a user interface a user may indicate that a given repository is to store X bytes of an installation image.

As another example, the input manager 312 may read configuration input from a configuration file. This configuration input may specify sizes for one or more repositories. In this manner, the input manager 312 may indicate sizes for repositories in manner in which installation may proceed without being attended by a user.

The metadata manager 311 may be operable to obtain metadata that indicates a set of allowed combinations of subsets of components of the installation image. As indicated previously, metadata may indicate that an operating system may be configured to have certain combinations of the components installed. The metadata manager 311 may obtain this information from metadata.

The size estimator 310 may be operable to calculate an amount of storage needed for the components based on the metadata. For example, the metadata may also indicate a size of the components. As another example, the metadata may indicate a location of the components so that a size may be calculated by examining the components directly. The size estimator 310 may add sizes together for components that are in a subset to determine a total size of storage needed for the components.

The distribution manager 313 may be operable to determine a distribution of the data of an installation image over the one or more repositories based on the one or more size indicators. The distribution manager 313 may use the metadata manager 311 and the size estimator 310 to determine the distribution. For example, the distribution manager 313 may indicate a subset of components of the installation image to place on a local repository based on factors including one or more of the amount of storage and allowed combinations of subsets of the components.

The distribution manager 313 may be further operable to search a data structure that indicates a priority for having each of the one or more subsets of components on the local repository. In one embodiment, this data structure may include a hierarchical data structure. In another embodiment, this data structure may include a prioritized list, queue, or other data structure. Based on the teachings herein, those skilled in the art may recognize many other data structures that may be used to indicate a priority without departing from the spirit or scope of aspects of the subject matter described herein.

The distribution of an installation image may be re-distributed. For example, a system administrator may determine that needs within an organization have changed and may desire to distribute an installation image in a different way than the installation image was previously distributed. To do this, the system administrator may provide new size indicators that indicate sizes that are to be distributed on various repositories. The distribution manager 313 may then determine a new distribution of the data of an installation image over the repositories based on the one or more new size indicators.

The storage manager 315 may be operable to store an indication of the distribution of data in a persistent data store. This indication may indicate where the components of the installation image are stored. For example, the storage manager 315 may store a data structure that associates subsets of components with repositories. Later, these data structure may be used to find identifiers of the repositories for use in obtaining the data from the repositories. The data may include code of an operating system that is to be installed, configured, or reconfigured using the data of the repositories.

The components of the installation image may be updated on one or more repositories with later versions of the components. When an operating system corresponding to the installation image is installed, configured, or re-configured, these later versions may be used so that the operating system is up-to-date.

The policy manager may encode policy information that indicates components of the operating system that are allowed to be installed. As indicated previously, this policy information may, for example, also indicate what components certain users are allowed to install.

Figure 4:
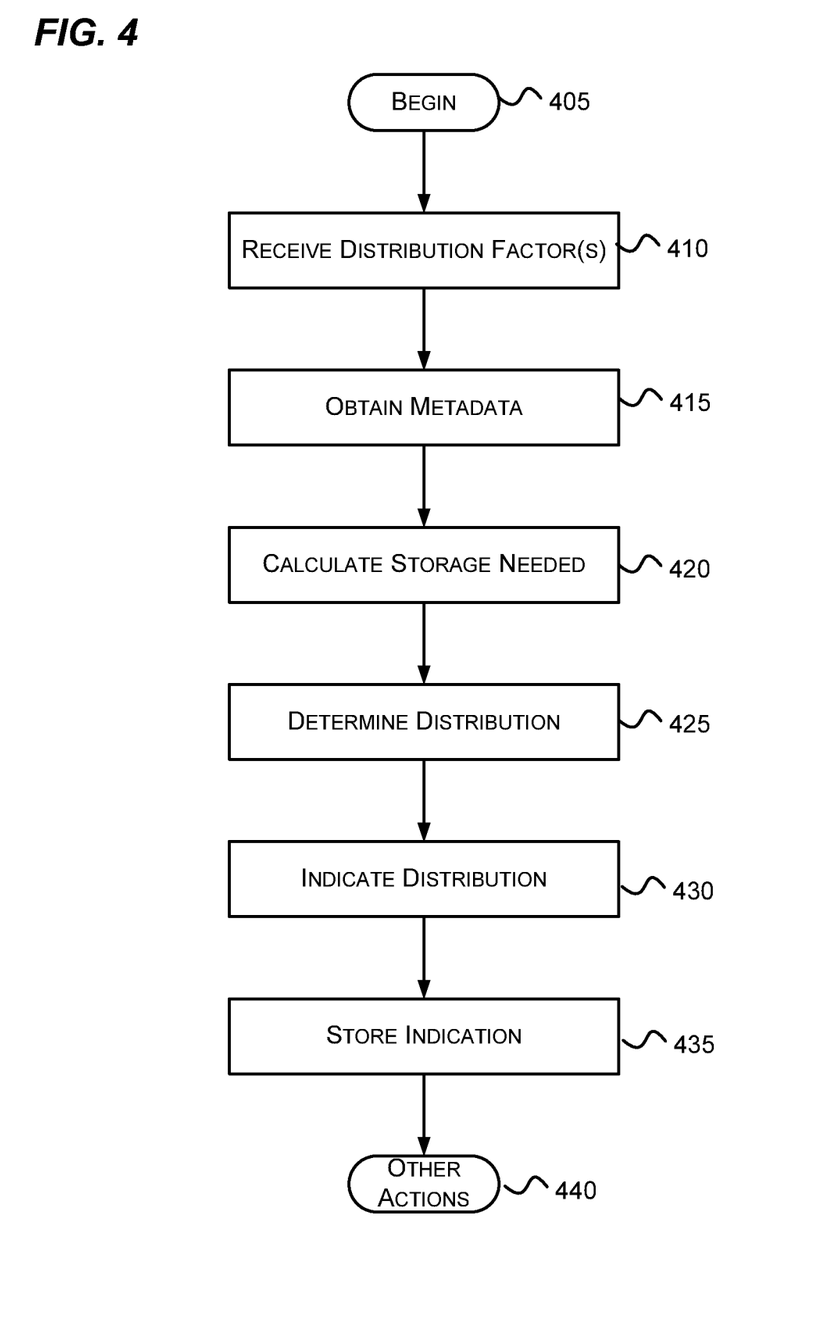
FIGS. 4-5 are flow diagrams that generally represent exemplary actions that may occur in accordance with aspects of the subject matter described herein.
Figure 5:
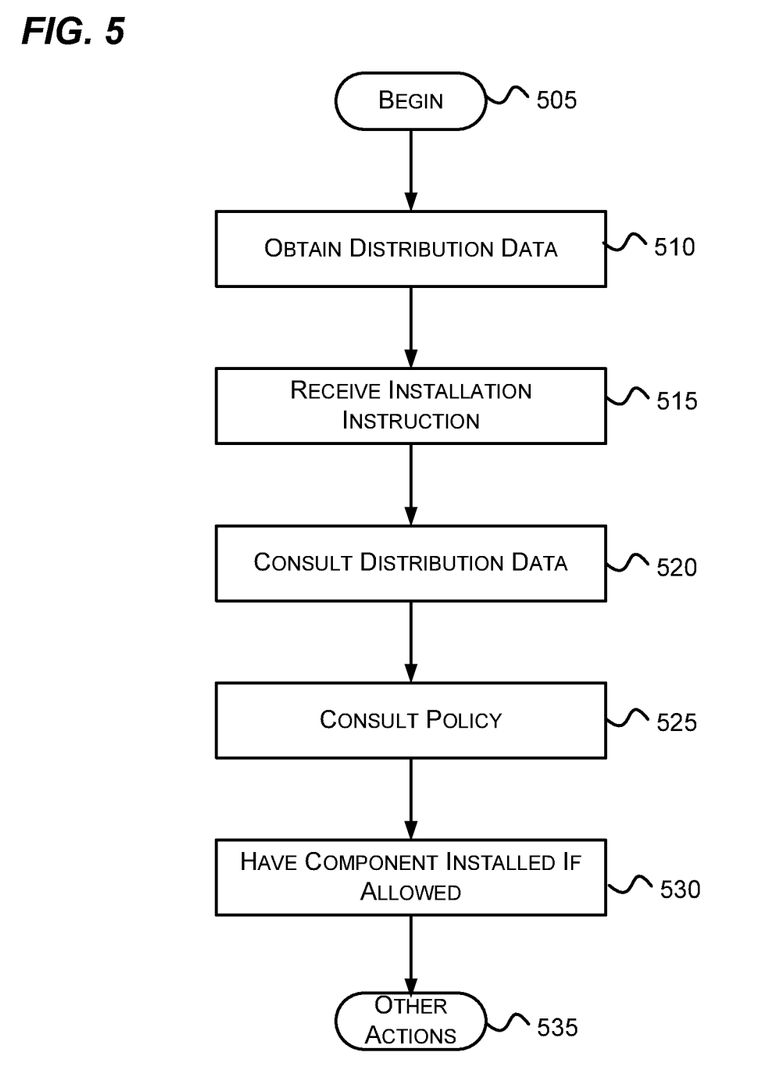

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, one or more factors are received for distributing data of an installation image to one or more repositories. For example, referring to FIG. 2, the image distributor 206 receives one or more size indicators that indicate maximum sizes for distributing data of an installation image to one or more of the repositories 210-213. As an example, the image distributor 206 may receive a size indicator for a local repository and may assume that any data that does not fit within that size is to be placed on remote repositories.

At block 415, metadata is received that indicates a set of allowed combinations of subsets of components of the installation image. For example, referring to FIG. 3, the metadata manager 311 may receive data that indicates allowed combinations of components.

At block 420, the amount of storage needed for the components is calculated based on the metadata. For example, referring to FIG. 3, the size estimator 310 may calculate an amount of storage needed by each component and may sum amounts together to determine the amount of storage needed for combinations of components. This information may be provided to the distribution manager 313 together with the size indicators so that the distribution manager 313 may determine an appropriate distribution of the data of the installation image.

At block 425, a distribution is determined for distributing the data of the installation image over the one or more repositories based on the one or more factors. For example, referring to FIG. 3, the distribution manager may take input (e.g., size indicators and corresponding repositories) from the input manager 312 together with input (e.g., amount of storage needed for combinations of components) from the size estimator 310 and may determine a distribution of the data of the installation image.

In determining a distribution of data over the one or more repositories, a distribution manager may determine a subset of components to place on a local repository based on factors including one or more of the size indicators, the amount of storage needed for the components, and allowed components of subsets of the components as has been described previously. For example, to determine the components to place on a local repository, a distribution manager may identify one or more sets of components where the components in each of the one or more sets are pre-designated for location together on one repository. The distribution manager may also ensure as it selects the one or more sets of components to store on a local repository that the one or more sets of components have a size less than the size of data to be located on the local repository.

The distribution manager may also determine a distribution where one portion of the data is distributed to a virtual storage device that is used to boot a virtual machine that hosts the operating system and where another portion of the data is distributed to a location outside of the virtual storage device At block 430, an indication is made of a distribution of the data of an installation image. For example, referring to FIG. 3, the distribution manager 313 may indicate which components are to be stored on which repositories.

At block 435, this indication is stored in a persistent data store for use in obtaining the data from the one or more repositories for installing, configuring, and/or re-configuring an operating system. For example, referring to FIG. 3, the storage manager 315 may store an indication of the distribution in a persistent data store such as a hard disk or other non-volatile memory. Later, this data may be used by an operating system to determine components that are stored locally (e.g., in a local repository) and components that are stored remotely (e.g., in one or more remote repositories) by accessing the local storage and without accessing a remote data store.

At block 435 other actions may occur. For example, policy information may also be encoded in the persistent data store. This policy information may, for example, indicate what components of an operating system are allowed to be installed and may also indicate users who are allowed to install certain components of the operating system.

Turning to FIG. 5, at block 505, the actions begin. At block 510, distribution data may be obtained of installable components of an operating system. For example, referring to FIG. 2, distribution data may be obtained from the repository 210 for use in installing a component of an operating system. The distribution data may indicate a repository upon which each installable component of an operating system is stored.

At block 515, an instruction to install an indicated component of the operating system is received. For example, an installation program may receive an instruction to install a component of an operating system. Here the phrase installation program may refer to a program that installs, uninstalls, configures, and/or re-configures components of an operating system.

At block 520, distribution data is consulted to determine a corresponding repository in which the indicated component is stored. For example, the installation program may consult the distribution data to find an identifier of a repository that stores the indicated component.

At block 525, policies may be checked to determine whether the policies allow installation of the indicated component as part of the operating system. This policy may be stored in policy data associated with the installable components. It may be integrated with the installable components (e.g., stored together with them) or stored in a separate location without departing from the spirit or scope of aspects of the subject matter described herein.

At block 530, if the policy allows installation, a request to install the indicated component together with an indication of the corresponding repository upon which the indicated component is stored may be sent to an installation manager. The installation manager may use this information to obtain and install the indicated component.

At block 535, other actions, if any, may be performed.

As can be seen from the foregoing detailed description, aspects have been described related to image distribution. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
receiving one or more factors for dividing up data of an installation image into a plurality of portions for apportionment of the plurality of portions over one or more repositories, the factors including one or more size indicators;
determining the apportionment of the data over the one or more repositories based on the one or more factors; and
storing an indication of the apportionment of the data in a persistent data store for use in obtaining the data from the one or more repositories when installing, configuring, and/or re-configuring an operating system corresponding with the installation image,
wherein the one or more size indicators comprises metadata indicative of an allowed combination of components of the installation image;
wherein the apportionment is determined in accordance with the allowed combination of components; and
wherein storing an indication comprises storing the indication on a local storage of the operating system in a manner wherein the operating system is capable of determining components that are stored locally and components that are stored remotely by accessing the local storage and without accessing a remote data store.

2. The method of claim 1, wherein receiving one or more factors comprises receiving a size of data to be located on a local repository of a device upon which the operating system is already installed or is to be installed.

3. The method of claim 2, further comprising:
calculating an amount of storage needed for the allowed combination of components based on the metadata; and
indicating a subset of the allowed combination of components to place on the local repository,
wherein determining the apportionment comprises determining a subset of the allowed combination of components to place on the local repository based on factors including one or more of the amount of storage and the allowed combination of components.

4. The method of claim 3, wherein determining the subset comprises identifying one or more sets of components, wherein the components in each of the one or more sets are pre-designated for location together on one repository, and wherein the one or more sets of components have a size less than the size of data to be located on the local repository.

5. The method of claim 4, wherein identifying one or more sets of components comprises searching a data structure that indicates a hierarchy of the one or more sets of components, the hierarchy indicating a priority for having each of the one or more sets of components on the local repository.

6. The method of claim 1, wherein receiving one or more factors for distributing data of an installation image to one or more repositories comprises receiving a size for at least one of the repositories, the size for the at least one of the repositories indicating a maximum size of data that is to be stored on the at least one of the repositories.

7. The method of claim 1, wherein determining the apportionment comprises determining a distribution where a first portion of the data is to be distributed to a virtual storage device that is used to boot a virtual machine that hosts the operating system and where a second portion of the data is to be distributed to a location outside of the virtual storage device.

8. The method of claim 1, wherein determining the apportionment comprises determining a distribution of installable components of the operating system, the operating system comprising one of: a server operating system, a desktop operating system, a mobile operating system, an embedded operating system, a cloud-based operating system, and an operating system installed or to be installed in a virtual environment.

9. The method of claim 1, wherein receiving one or more factors comprises receiving an indication of installable components of the operating system and an indication of a repository to which each of the installable components is to be distributed.

10. The method of claim 1, further comprising encoding policy information in the persistent data store, the policy information indicating what components of the operating system are allowed to be installed.

11. In a computing environment, a system comprising a processor and a memory on which instructions are stored for execution by the processor, the instructions being configured for implementation of a plurality of modules, the modules comprising:
a first module configured to receive one or more factors for dividing up data of an installation image into a plurality of portions for apportionment of the plurality of portions over one or more repositories, the factors including one or more size indicators;
a second module configured to determine the apportionment of the data over the one or more repositories based on the one or more factors; and
a third module configured to store an indication of the apportionment of the data in a persistent data store for use in obtaining the data from the one or more repositories when installing, configuring, and/or re-configuring an operating system corresponding with the installation image,
wherein the one or more size indicators comprises metadata indicative of an allowed combination of components of the installation image;
wherein the apportionment is determined in accordance with the allowed combination of components; and
wherein the third module is further configured to store the indication on a local storage of the operating system in a manner wherein the operating system is capable of determining components that are stored locally and components that are stored remotely by accessing the local storage and without accessing a remote data store.

12. The system of claim 11, wherein the first module is further configured to receive a size of data to be located on a local repository of a device upon which the operating system is already installed or is to be installed.

13. The system of claim 12, wherein the plurality of modules further comprise:
a fourth module configured to calculate an amount of storage needed for the allowed combination of components based on the metadata; and
a fifth module configured to indicate a subset of the allowed combination of components to place on the local repository,
wherein the second module is further configured to determine a subset of the allowed combination of components to place on the local repository based on factors including one or more of the amount of storage and the allowed combination of components.

14. The system of claim 13, wherein the second module is further configured to identify one or more sets of components, wherein the components in each of the one or more sets are pre-designated for location together on one repository, and wherein the one or more sets of components have a size less than the size of data to be located on the local repository.

15. The system of claim 11, wherein the second module is further configured to determine a distribution where a first portion of the data is to be distributed to a virtual storage device that is used to boot a virtual machine that hosts the operating system and where a second portion of the data is to be distributed to a location outside of the virtual storage device.

16. A computer storage memory having computer-executable instructions, which when executed perform actions, the computer storage memory excluding propagation signals, the actions comprising:
receiving one or more factors for dividing up data of an installation image into a plurality of portions for apportionment of the plurality of portions over one or more repositories, the factors including one or more size indicators;
determining the apportionment of the data over the one or more repositories based on the one or more factors;
storing an indication of the apportionment of the data in a persistent data store for use in obtaining the data from the one or more repositories when installing, configuring, and/or re-configuring an operating system corresponding with the installation image;
calculating an amount of storage needed for the allowed combination of components based on the metadata; and
indicating a subset of the allowed combination of components to place on the local repository,
wherein the one or more size indicators comprises metadata indicative of an allowed combination of components of the installation image;
wherein the apportionment is determined in accordance with the allowed combination of components;
wherein receiving one or more factors comprises receiving a size of data to be located on a local repository of a device upon which the operating system is already installed or is to be installed; and
wherein determining the apportionment comprises determining a subset of the allowed combination of components to place on the local repository based on factors including one or more of the amount of storage and the allowed combination of components.

17. The computer storage memory of claim 16, further comprising:
calculating an amount of storage needed for the allowed combination of components based on the metadata; and
indicating a subset of the allowed combination of components to place on the local repository,
wherein:
receiving one or more factors comprises receiving a size of data to be located on a local repository of a device upon which the operating system is already installed or is to be installed;
determining the apportionment comprises determining a subset of the allowed combination of components to place on the local repository based on factors including one or more of the amount of storage and the allowed combination of components; and determining the subset comprises identifying one or more sets of components, wherein the components in each of the one or more sets are pre-designated for location together on one repository, and wherein the one or more sets of components have a size less than the size of data to be located on the local repository.

18. The computer storage memory of claim 16, wherein determining the apportionment comprises determining a distribution where a first portion of the data is to be distributed to a virtual storage device that is used to boot a virtual machine that hosts the operating system and where a second portion of the data is to be distributed to a location outside of the virtual storage device.

19. The computer storage memory of claim 16, wherein storing an indication comprises storing the indication on a local storage of the operating system in a manner wherein the operating system is capable of determining components that are stored locally and components that are stored remotely by accessing the local storage and without accessing a remote data store.

\* \* \* \* \*